J. FERNANDEZ.
AUTOMOBILE SIGNAL.
APPLICATION FILED MAR. 4, 1914.
1,202,696.
Patented Oct. 24, 1916.
2 SHEETS—SHEET 1.
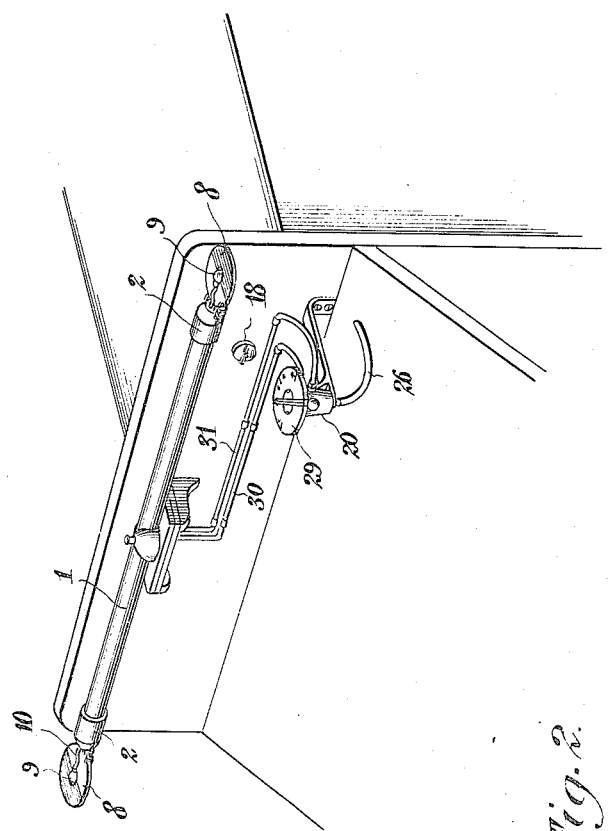
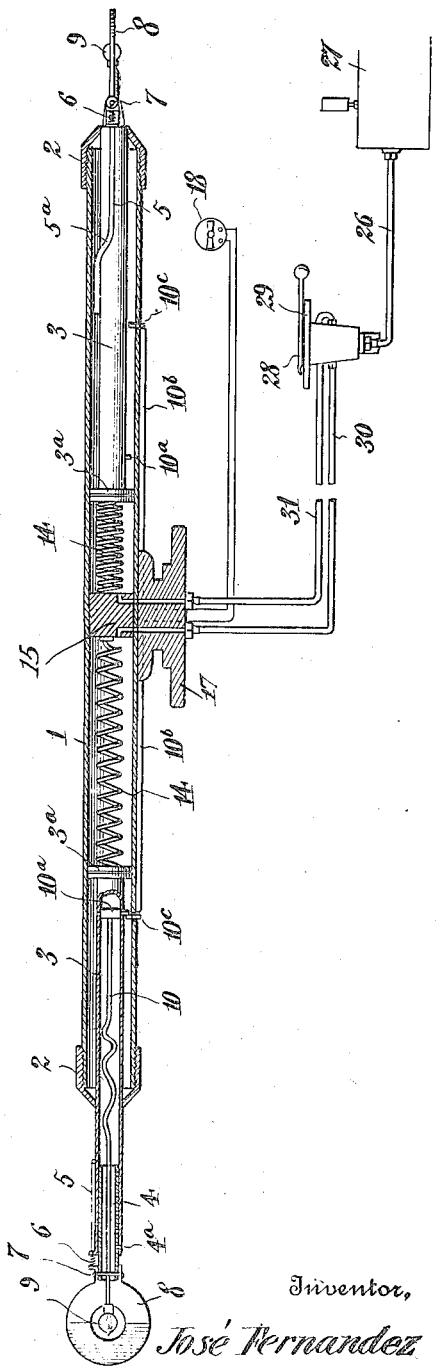
Inventor,
José Fernandez
By Victor J. Evans,
Attorney.
Witnesses:
C. Feinle Jr.,
V. B. Hillyard.

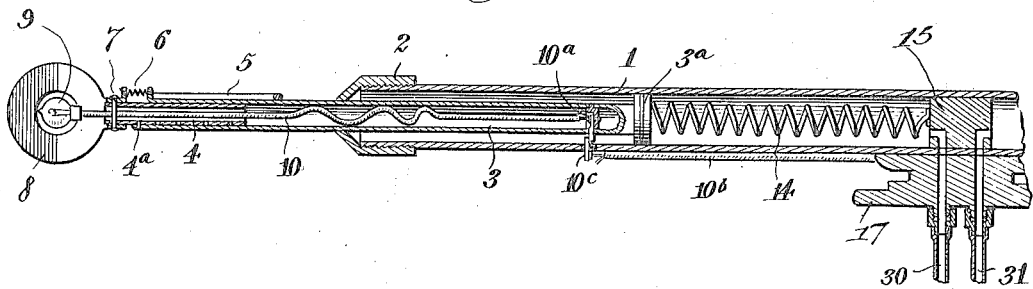
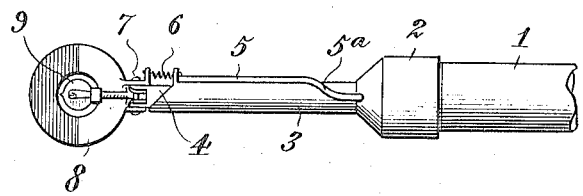
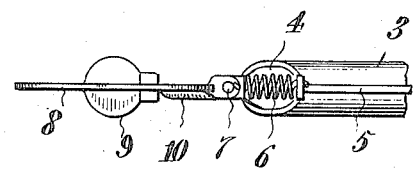
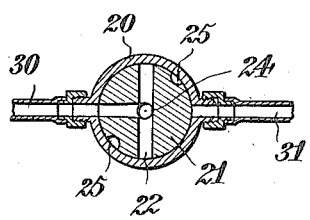
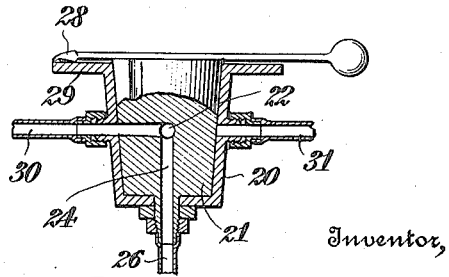

UNITED STATES PATENT OFFICE.

JOSÉ FERNANDEZ, OF HOUSTON, TEXAS.

AUTOMOBILE-SIGNAL.

1,202,696.

Specification of Letters Patent.

Patented Oct. 24, 1916.

Application filed March 4, 1914. Serial No. 822,462.

*To all whom it may concern:*

Be it known that I, JOSÉ FERNANDEZ, a citizen of the United States, residing at Houston, in the county of Harris and State of Texas, have invented new and useful Improvements in Automobile-Signals, of which the following is a specification.

The invention provides novel signaling means for motor vehicles to give ample warning so as to avoid collisions or accidents, said signaling means being of such construction as to be readily applied to motor vehicles of any design whether intended for passenger service or for hauling loads.

The invention provides an appliance embodying oppositely disposed signal devices and means for projecting either one or both of such signal devices into a position to give warning of the intention of the operator of the vehicle whether about to stop, to slacken speed or to make a turn to the right or to the left so that the driver of a vehicle in the rear may be advised of the intention of the driver of the vehicle ahead and govern himself accordingly, so as to prevent a rearend collision.

The invention consists of opposed cylinders, pistons arranged to operate therein, signal devices at the outer ends of the piston rods, means for positively actuating the pistons in both directions, one of such means consisting of a spring and the other being a motive fluid, means for giving a partial turn to the signal, both when projected and retracted so that when the signal is extended it presents a broad side for ready observation, and when in retracted position it presents an edge so as not to attract attention, and a valve for controlling the supply of motive fluid to the cylinders, whereby one or both of the signals may be projected into position for observation.

The invention consists of the novel features, details of construction and combination of parts, which hereinafter will be more particularly set forth, illustrated and claimed.

In the drawings hereto attached: Figure 1 is a view in elevation of a signal for motor vehicles embodying the invention. Fig. 2 is a diagrammatic view showing the cylinders in section and one of the signals in retracted position and the other signal projected. Fig. 3 is an enlarged section of one of the cylinders and pistons showing the relative arrangement of the parts associated therewith. Fig. 4 is a detail view showing more clearly the means for imparting a one-quarter turn to the signal when the same is moved outward or returned to normal position. Fig. 5 is a detail view showing the hinge and spring connection between one of the signal devices and its supports. Figs. 6 and 7 are detailed views of the controlling valves.

Corresponding and like parts are referred to in the following description, and indicated in all the views of the drawing, by the same reference characters.

The numeral 1 designates oppositely disposed cylinders which consist essentially of end portions of a tube. A cap 2 is fitted to the outer end of each of the cylinders. A piston $3^a$ operates in each cylinder and is provided with a hollow rod 3 which operates through an opening in the cap 2. A section 4 is adjustable in the outer end of the rod 3 and is likewise made hollow and is adapted to be secured in the adjusted position by means of suitable fastening means $4^a$, such as set screws. A guide 5 is secured at its outer end to the piston rod 3 and is given a one-quarter turn $5^a$ near its inner end to cause the piston and its rod to make a one-quarter turn both when the piston is moved outward or drawn inward, whereby the signal device 8 at the outer end of the piston rod is caused to present a broad side or an edge view. The guide 5 consists of a light rod or wire and is arranged to operate in an opening formed in the cap 2. When the piston $3^a$ is near the limit of its outward movement it has a one-quarter turn given thereto by the action of the bent or deflected portion $5^a$ of the guide rod 5, thereby turning the signal so as to present a broad side for observation. When the piston starts on its return stroke it receives a one-quarter turn to cause the signal to present an edge view so as not to attract attention when withdrawn or in normal position. The piston is moved outward to project the signal into position for ready observation by means of a motive fluid, such as compressed air and is moved inward by means of a spring 14 which is preferably of the helical contractile type. The spring 14 is expanded when the piston is moved outward and when the motive fluid is cut off and the exhaust uncovered the spring 14 contracting moves the piston inward and at the same time causes the air to be expelled from the cylinder through the exhaust. The part 4ª may be considered as a section of the piston rod and admits of such piston rod being lengthened when adapting the signal to different makes of motor vehicles.

The signal 8 consists of a plate or disk which may be suitably colored or have any matter inscribed thereon. When the piston is at the limit of its inward movement the signal 8 occupies a horizontal position so as to present an edge view, but when the piston is at the limit of its outward movement the signal occupies a vertical position, thereby presenting a broad side for ready observation. To prevent the signal from injury when struck by an object it is pivotally connected to its supporting arm or extension 4 of the piston rod as indicated at 7 and a spring 6 holds such signal in line with its support. Should the signal 8 strike an object, it turns about its pivot 7 and after clearing such object it is returned to normal position by the action of the spring 6.

An electric lamp 9 is carried by the signal 8 to illuminate the same after dark. An electric conductor 10 arranged within the hollow piston rod 3 is connected at one end with the lamp 9 and at its opposite end with terminals 10ª. An electric conductor 10ᵇ located exterior to the cylinder is connected with terminals 10ᶜ arranged within the cylinder and is also included in a circuit containing means for supplying electricity for illuminating the lamp when the circuit is closed. A switch 18 is located in the lighting circuit to admit of closing or breaking the same. The terminals 18ª and 10ᶜ serve as a stop means for limiting the outward movement of the piston, besides closing the circuit when the switch 18 is thrown to effect a lighting of the lamp when the circuit is completed.

The controlling valve comprises a casing 20 and a plug 21. The latter is formed with a transverse passage 22 and a lateral passage 23 such passages being in communication with each other and with an axial passage 24. Other passages 25 are formed in the sides of the plug 21 and serve to carry off the exhaust from the cylinder when bleeding the same. A tube 26 connects the axial passage 24 of the plug with a reservoir 27 which contains the motive fluid such as compressed air. A pointer 28 is connected to or formed with the plug 21 and serves both as a handle for turning such plug and as means for indicating its relative position. A plate 29 is connected with the casing 20 and is provided with marks indicating predetermined positions of the valve so that it may be known when the motive fluid is supplied either to the right or to the left hand cylinder or to both or when such motive fluid is cut off to admit of both signal devices occupying a normal position. A block 15 is located at the inner ends of the cylinders or midway of the tube comprising such cylinders. Passages are formed in the block 15 leading into the respective cylinders. Pipes 30 and 31 connect the respective passages of the block 15 with the valve casing 20. When the plug 21 is turned to the right the passage 23 is brought in register with the pipe 31 whereby motive fluid is admitted into the right hand cylinder which results in projecting the right hand signal into position for observation. Upon turning the plug 21 to the left the passage 23 is caused to register with the pipe 30 thereby admitting motive fluid into the left hand cylinder with the result that the signal upon the left hand side of the vehicle is projected into position to be readily seen. When the plug 21 is turned to a central position that is with the pointer 28 facing straight ahead, motive medium is admitted into both cylinders thereby projecting both the right and the left signal devices so that the driver of the vehicle in the rear may exercise caution, thereby preventing a rearend collision. When both signals are projected it indicates that the driver of the vehicle is either about to stop or to slow up. When the right hand signal is displayed it indicates that the driver is about to turn to the right and when the left hand signal is projected it indicates that the driver is about to turn to the left. When the plug 21 is turned either to the right or to the left to an intermediate position between the two extreme positions the passages 25 are brought in register with the pipes 30 and 31, thereby admitting of the cylinders meeting or exhausting so that the signals may be returned to normal position by the action of the springs 14. The device may be attached to the motor vehicle in any manner and as shown a base plate 17 is connected with the tube comprising the cylinders, such base plate being bolted or otherwise attached to the vehicle in a position to admit of the cylinders occupying a transverse position.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. A signal for motor vehicles, the same comprising opposed cylinders, pistons arranged to operate within such cylinders, signal devices connected with such pistons to move therewith, means for supplying motive fluid to the cylinders for projecting the pistons, a spring for retracting such pistons and a valve for controlling the supply of motive fluid to one or the other or simultaneously to both of such cylinders.

2. A signal for motor vehicles, the same comprising opposed cylinders, pistons arranged to operate therein, signal devices connected with the respective pistons, a block common to both cylinders and having passages in communication therewith, a spring for retracting each of the pistons, pipes connected with the respective passages of the said block, means for supplying motive fluid to the pipes and a valve in the length of the pipes to admit of supplying the motive fluid to either one or both of the cylinders.

3. A motor vehicle signal comprising opposed cylinders, a block common to both cylinders and having passages in communication therewith, pistons arranged to operate in the cylinders and provided with signal devices which are connected therewith, contractile helical springs arranged within the cylinders and connecting the pistons with the said block, pipes connected with the passages of the block, means for supplying motive fluid to the pipes, and a controlling valve in the length of the pipes for admitting the motive fluid to one or the other or to both of the cylinders.

4. A signal for motor vehicles, the same comprising horizontally disposed opposed integral cylinders, pistons arranged to operate therein and longitudinal of the cylinders, signal devices connected with the respective pistons, a block common to both cylinders and having passages in communication therewith, a spring for retracting each of the pistons having connection with the said block and pistons, pipes connected with the respective passages of the said block, means for supplying motive fluid to the pipes and a valve in the length of the pipes to admit of supplying the motive fluid to either or both of the cylinders.

In testimony whereof I affix my signature in presence of two witnesses.

JOSÉ FERNANDEZ.

Witnesses:
Y. GARY,
ALBERTO EADS.